(12) United States Patent
Crabtree et al.

(10) Patent No.: US 12,500,767 B2
(45) Date of Patent: Dec. 16, 2025

(54) KERBEROS INTERDICTION AND DECRYPTION FOR REAL-TIME ANALYSIS

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 188 days.

(21) Appl. No.: 18/354,664

(22) Filed: Jul. 19, 2023

(65) Prior Publication Data
US 2025/0030548 A1 Jan. 23, 2025

(51) Int. Cl.
*H04L 9/32* (2006.01)

(52) U.S. Cl.
CPC ................... *H04L 9/3213* (2013.01)

(58) Field of Classification Search
CPC ............... H04L 9/3213; H04L 9/0891
See application file for complete search history.

(56) References Cited

U.S. PATENT DOCUMENTS

| | | |
|---|---|---|
| 5,669,000 A | 9/1997 | Jessen et al. |
| 6,256,544 B1 | 7/2001 | Weissinger |
| 6,477,572 B1 | 11/2002 | Elderton et al. |
| 7,072,863 B1 | 7/2006 | Phillips et al. |
| 7,657,406 B2 | 2/2010 | Tolone et al. |
| 7,698,213 B2 | 4/2010 | Lancaster |
| 7,739,653 B2 | 6/2010 | Venolia |
| 8,065,257 B2 | 11/2011 | Kuecuekyan |
| 8,145,761 B2 | 3/2012 | Liu et al. |
| 8,281,121 B2 | 10/2012 | Nath et al. |
| 8,615,800 B2 | 12/2013 | Baddour et al. |
| 8,788,306 B2 | 7/2014 | Delurgio et al. |
| 8,793,758 B2 | 7/2014 | Raleigh et al. |
| 8,914,878 B2 | 12/2014 | Burns et al. |
| 8,997,233 B2 | 3/2015 | Green et al. |
| 9,134,966 B2 | 9/2015 | Brock et al. |
| 9,141,360 B1 | 9/2015 | Chen et al. |
| 9,231,962 B1 | 1/2016 | Yen et al. |
| 9,294,497 B1 | 3/2016 | Ben-Or et al. |
| 9,306,965 B1 | 4/2016 | Grossman et al. |
| 9,602,530 B2 | 3/2017 | Ellis et al. |
| 9,654,495 B2 | 5/2017 | Hubbard et al. |
| 9,672,355 B2 | 6/2017 | Titonis et al. |
| 9,686,308 B1 | 6/2017 | Srivastava |
| 9,762,443 B2 | 9/2017 | Dickey |
| 9,887,933 B2 | 2/2018 | Lawrence, III |

(Continued)

FOREIGN PATENT DOCUMENTS

| | | |
|---|---|---|
| WO | 2014159150 A1 | 10/2014 |
| WO | 2017075543 A1 | 5/2017 |

OTHER PUBLICATIONS

Reyes, PCT International Search Report, Nov. 28, 2024, pp. 1-3, Patent Cooperation Treaty.

*Primary Examiner* — Abu S Sholeman
(74) *Attorney, Agent, or Firm* — Galvin Patent Law LLC; Brian R. Galvin

(57) ABSTRACT

A system and methods for Kerberos protocol collection, interdiction and decryption for real-time analysis to aid in both operational and security functions in SSO-enabled networks, using agent processes that intercept and decrypt Kerberos traffic to identify compromised credentials and accounts in real-time without exposing sensitive information.

8 Claims, 10 Drawing Sheets

(56) References Cited

U.S. PATENT DOCUMENTS

| | | |
|---|---|---|
| 9,946,517 B2 | 4/2018 | Talby et al. |
| 10,050,789 B2 * | 8/2018 | McCallum ............ H04L 9/3242 |
| 10,061,635 B2 | 8/2018 | Ellwein |
| 10,102,480 B2 | 10/2018 | Dirac et al. |
| 10,122,748 B1 * | 11/2018 | Currie ................. H04L 63/1433 |
| 10,210,246 B2 | 2/2019 | Stojanovic et al. |
| 10,210,255 B2 | 2/2019 | Crabtree et al. |
| 10,216,485 B2 | 2/2019 | Misra et al. |
| 10,242,406 B2 | 3/2019 | Kumar et al. |
| 10,248,910 B2 | 4/2019 | Crabtree et al. |
| 10,318,882 B2 | 6/2019 | Brueckner et al. |
| 10,367,829 B2 | 7/2019 | Huang et al. |
| 10,511,498 B1 | 12/2019 | Narayan et al. |
| 2003/0041254 A1 | 2/2003 | Challener et al. |
| 2003/0145225 A1 | 7/2003 | Bruton et al. |
| 2003/0229779 A1 * | 12/2003 | Morais ................ H04L 63/0209 |
| | | 713/153 |
| 2004/0098610 A1 | 5/2004 | Hrastar |
| 2005/0289072 A1 | 12/2005 | Sabharwal |
| 2006/0149575 A1 | 7/2006 | Varadarajan et al. |
| 2007/0150744 A1 | 6/2007 | Cheng et al. |
| 2008/0114885 A1 | 5/2008 | Kulkarni et al. |
| 2008/0115213 A1 | 5/2008 | Bhatt et al. |
| 2009/0012760 A1 | 1/2009 | Schunemann |
| 2009/0064088 A1 | 3/2009 | Barcia et al. |
| 2009/0089227 A1 | 4/2009 | Sturrock et al. |
| 2009/0182672 A1 | 7/2009 | Doyle |
| 2009/0222562 A1 | 9/2009 | Liu et al. |
| 2009/0222656 A1 * | 9/2009 | Rouskov ............... H04L 9/3213 |
| | | 380/255 |
| 2009/0293128 A1 | 11/2009 | Lippmann et al. |
| 2011/0060821 A1 | 3/2011 | Loizeaux et al. |
| 2011/0087888 A1 | 4/2011 | Rennie |
| 2011/0154341 A1 | 6/2011 | Pueyo et al. |
| 2012/0204032 A1 * | 8/2012 | Wilkins ................. H04L 9/321 |
| | | 713/170 |
| 2012/0266244 A1 | 10/2012 | Green et al. |
| 2013/0073062 A1 | 3/2013 | Smith et al. |
| 2013/0132149 A1 | 5/2013 | Wei et al. |
| 2013/0191416 A1 | 7/2013 | Lee et al. |
| 2013/0246996 A1 | 9/2013 | Duggal et al. |
| 2013/0304623 A1 | 11/2013 | Kumar et al. |
| 2014/0074826 A1 | 3/2014 | Cooper et al. |
| 2014/0156806 A1 | 6/2014 | Karpistsenko et al. |
| 2014/0244612 A1 | 8/2014 | Bhasin et al. |
| 2014/0245443 A1 | 8/2014 | Chakraborty |
| 2014/0279762 A1 | 9/2014 | Xaypanya et al. |
| 2015/0095303 A1 | 4/2015 | Sonmez et al. |
| 2015/0149979 A1 | 5/2015 | Talby et al. |
| 2015/0163242 A1 | 6/2015 | Laidlaw et al. |
| 2015/0169294 A1 | 6/2015 | Brock et al. |
| 2015/0195192 A1 | 7/2015 | Vasseur et al. |
| 2015/0236935 A1 | 8/2015 | Bassett |
| 2015/0281225 A1 | 10/2015 | Schoen et al. |
| 2015/0317481 A1 | 11/2015 | Gardner et al. |
| 2015/0339263 A1 | 11/2015 | Ata et al. |
| 2015/0347414 A1 | 12/2015 | Xiao et al. |
| 2015/0379424 A1 | 12/2015 | Dirac et al. |
| 2016/0004858 A1 | 1/2016 | Chen et al. |
| 2016/0028758 A1 | 1/2016 | Ellis et al. |
| 2016/0072845 A1 | 3/2016 | Chiviendacz et al. |
| 2016/0078361 A1 | 3/2016 | Brueckner et al. |
| 2016/0099960 A1 | 4/2016 | Gerritz et al. |
| 2016/0105454 A1 | 4/2016 | Li et al. |
| 2016/0140519 A1 | 5/2016 | Trepca et al. |
| 2016/0212171 A1 | 7/2016 | Senanayake et al. |
| 2016/0275123 A1 | 9/2016 | Lin et al. |
| 2016/0285732 A1 | 9/2016 | Brech et al. |
| 2016/0342606 A1 | 11/2016 | Mouel et al. |
| 2016/0350442 A1 | 12/2016 | Crosby |
| 2016/0364307 A1 | 12/2016 | Garg et al. |
| 2017/0013003 A1 | 1/2017 | Samuni et al. |
| 2017/0019678 A1 | 1/2017 | Kim et al. |
| 2017/0063896 A1 | 3/2017 | Muddu et al. |
| 2017/0083380 A1 | 3/2017 | Bishop et al. |
| 2017/0126712 A1 | 5/2017 | Crabtree et al. |
| 2017/0139763 A1 | 5/2017 | Ellwein |
| 2017/0149802 A1 | 5/2017 | Huang et al. |
| 2017/0193110 A1 | 7/2017 | Crabtree et al. |
| 2017/0206360 A1 | 7/2017 | Brucker et al. |
| 2017/0264617 A1 | 9/2017 | Hart |
| 2017/0322959 A1 | 11/2017 | Tidwell et al. |
| 2017/0323089 A1 | 11/2017 | Duggal et al. |
| 2018/0197128 A1 | 7/2018 | Carstens et al. |
| 2018/0300930 A1 | 10/2018 | Kennedy et al. |
| 2019/0075134 A1 | 3/2019 | Ylonen |
| 2019/0082305 A1 | 3/2019 | Proctor |
| 2019/0095533 A1 | 3/2019 | Levine et al. |
| 2021/0021605 A1 | 1/2021 | Innes et al. |
| 2021/0034748 A1 * | 2/2021 | Ahmed ................. G06F 21/572 |
| 2021/0367966 A1 * | 11/2021 | Yanay ................... G06N 20/00 |

* cited by examiner

Monitor traffic at KDC using host-based IA 610

↓

Notify KDC of observed compromise and store timestamped record of the discovery 620

↓

Receive credential revocation event from KDC 630

↓

Store timestamped revocation in database 640

↓

Receive notification of compromised credentials from another host-based IA 650

↓

Store timestamped notification event in database 660

Database 105

KERBEROS INTERDICTION AND DECRYPTION FOR REAL-TIME ANALYSIS

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The disclosure relates to the field of Kerberos-based network authentication, and more particularly to intercepting and decrypting Kerberos authentication traffic in real-time as part of holistic identity assurance in computer networks.

Discussion of the State of the Art

Kerberos is a network authentication protocol that uses symmetric-key cryptography to provide strong security for user authentication. When a user logs in to a Kerberos-secured network, they are issued a single sign on ticket that proves their identity and access for a specific service of interest. This streamlines user experience while maintaining centralized control over user requests to network resources, such as a file or a printer. When a given request occurs, the resource server needs to verify that the user has permission to access that resource. The server sends a message to the Kerberos authentication server, a.k.a. Key Distribution Center, asking it to verify the user. The authentication server facilitates a (in a normal basic deployment) 6-way handshake and responds by sending a session key, encrypted with the user's password, to the resource server. The resource server then decrypts the session key using the user's password, and uses the session key to authenticate the user and provide access to the requested resource. To decrypt the session key, the resource server uses the user's password to derive a symmetric key, which is then used to decrypt the encrypted session key received from the authentication server. This ensures that only the resource server and the user who knows the password can access the session key, providing a secure way to authenticate users and authorize access to resources. This ensures network and service availability when KDCs are deployed in highly available configurations.

Kerberos uses encryption algorithms that are considered strong, but ultimately all digital keys are still vulnerable to certain types of credential theft, replay, cracking, or forgery, or manipulation attacks. To mitigate these risks, it is recommended to use additional security measures, such as managed service accounts with strong system managed passwords, risk-based multi-factor authentication, and Identity Threat Detection and Response capabilities that includes Kerberos stateful protocol verification of each ticket issuance and ultimate use. One additional technique that can be used in some environments is FAST (Flexible Authentication Secure Tunneling), an extension to Kerberos that provides enhanced security and performance. It was developed to address some of the limitations of the original Kerberos protocol implementations. Specifically, FAST provides a more secure mechanism for exchanging encryption keys between the client and server. By combining Kerberos FAST with external stateful validation and end-to-end observation of Kerberos and SAML exchanges, organizations can significantly enhance their ability to detect and prevent sophisticated attacks like the Sunburst and SolarWinds type incidents, which leverage multiple authentication protocols (e.g., NTLM, Kerberos and SAML) and components to gain unauthorized access and ultimately domain dominance in both traditional and cloud resource environments.

Relying solely on Kerberos FAST is not sufficient to detect advanced attacks like the SolarWinds attacks, which leveraged Active Directory, Kerberos, SAML federation, and SAML certificates to gain domain dominance across multiple companies and government agencies. To better detect and prevent such attacks, organizations can implement external stateful validation of the Kerberos protocol and SAML protocols using end-to-end observation of all Kerberos exchanges, while also considering the potential usage of ADFS or AD Connect-based links to SAML/OAuth2 identity providers in federated configurations.

What is needed, is a system and methods to cohesively decrypt Kerberos tickets and combine Kerberos with FAST enabled with external stateful validation and end-to-end observation of Kerberos and SAML exchanges to gain access to additional information of interest to defenders and network operators in understanding and assuring the security of their network beginning at the core authentication infrastructure.

SUMMARY OF THE INVENTION

Accordingly, the inventor has conceived and reduced to practice, a system and methods for Kerberos protocol collection, interdiction and decryption for real-time analysis to aid in both operational and security functions in SSO-enabled networks.

According to one aspect, a system for Kerberos interdiction and decryption for real-time analysis, comprising: an interdiction agent comprising at least a first plurality of programming instructions stored in a memory of, and operating on at least one processor of, a computing device, wherein the first plurality of programming instructions, when operating on the at least one processor, causes the computing device to: import an authentication private key from a data store; receive a network request comprising authentication information; decrypt the authentication information using the private key; analyze the decrypted information to determine its validity; and generate a notification comprising the results of the analysis, is disclosed.

According to another aspect, a method for Kerberos interdiction and decryption for real-time analysis, comprising the steps of: importing, at an interdiction agent, an authentication private key from a data store; receiving a network request comprising authentication information; decrypting the authentication information using the private key; analyzing the decrypted information to determine its validity; and generating a notification comprising the results of the analysis, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exem- FIG. 1 is a block diagram illustrating an exemplary system architecture for Kerberos network authentication, according to one aspect.

DETAILED DESCRIPTION OF THE INVENTION

Figure 1:
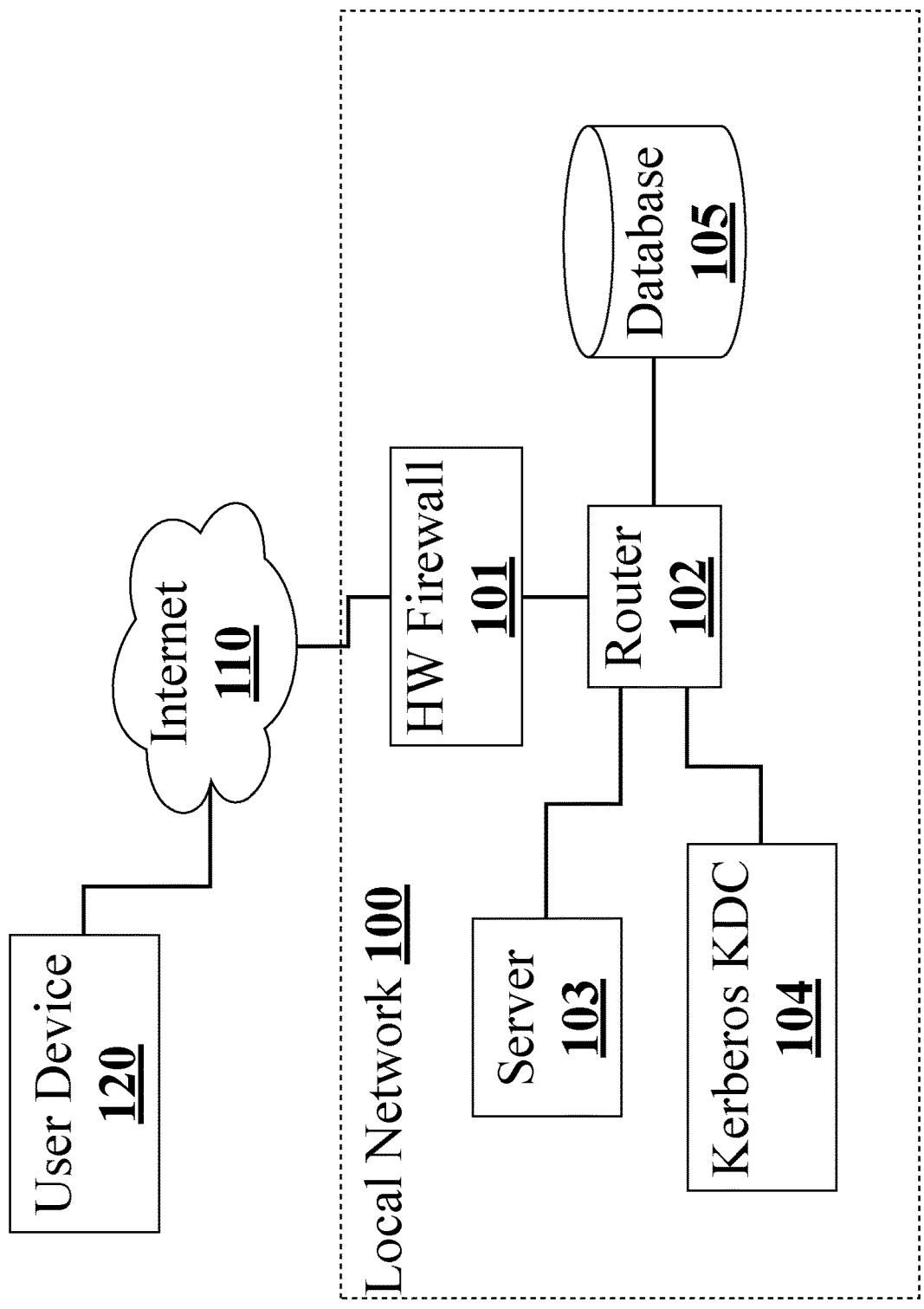

The inventor has conceived, and reduced to practice, a system and methods for Kerberos decryption and FAST-enhanced Kerberos and NTLM network layer collection, inspection, interdiction and response.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical. The disclosed invention is specifically designed to accommodate common fallacies of distributed computing, noting that network disruptions and errors are facts of life and must be accounted for by collection, transport, aggregation, analytics, planning and response functions that can flexibly accommodate and improve outcomes under a wide range of operational scenarios.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Client" as used herein means any software or hardware that accesses computing functionality made available by a server.

"Client device" as used herein means any computing device that accesses functionality made available by a server. The term client device often, but not exclusively, refers to a computing device that accesses a computing service made available by a server via a network. Many computing devices are capable of being both client devices and servers. Client devices may be either wired, wireless, or both.

"Network" as used herein means two or more computing devices configured to communicate with one another.

"Server" as used herein means any software or hardware that offers computing functionality for use by clients. Such functionality is often called a "service," and non-limiting examples of such functionality are sharing of files and storage, making computations and returning results, distributing computations among multiple processes or devices, and transferring data.

"Wireless network" as used herein means two or more computing devices configured to communicate with one another, wherein at least one of the communications in the network is performed wirelessly. Non-limiting examples of wireless communication are WiFi, Bluetooth, and cellular communications.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

Conceptual Architecture

FIG. 1 is a block diagram illustrating an exemplary system architecture for Kerberos network authentication, according to one aspect. In an exemplary network 100, a plurality of network-connected resources such (for example, including but not limited to) one or more servers 103 or databases 105 may be connected through a network router 102 to provide network access to authorized users. A hardware firewall 101 may provide network-level security for traffic to and from the Internet 110, such as connections between networked resources and user devices 120 residing outside the local network (for example, a user's smartphone or personal computing device connecting from a remote location such as in a work-from-home arrangement). User authentication may be provided by a Kerberos domain controller (KDC) 104, which may store various records of user accounts, permission levels, resource access and other privileges, or organizational information such as departments and employee hierarchical records. In addition to storing these records and performing the role of a domain controller, KDC 104 provides authentication tickets to authorized users to grant them authorized sessions with which they may exercise whatever privileges their account has been grants; for example, a user attempting to access a service provided by a server 103 may authenticate with their login credentials (generally, a username and password or analogous credential information, optionally including additional multifactor authentication codes or tokens depending on a particular arrangement), the KDC will verify the credentials as valid for that user and that the user is authorized to use the service being requested, and the KDC will then issue an authentication ticket that the user then provides to the server, which then grants access to the service.

In traditional Kerberos, an encryption key is used for communication between the client and server, and is derived from the user's password. This presents a security risk because an attacker who can obtain the user's password can also obtain the encryption key and potentially gain access to the network. In FAST, the encryption key is generated using a stronger algorithm and is not based on the user's password. This makes it more difficult for an attacker to obtain the encryption key from observed/captured network traffic. Additionally, FAST includes a mechanism for tunneling Kerberos traffic over HTTPS, which provides additional security and can improve performance in certain network configurations. Overall, Kerberos decryption and FAST enhanced Kerberos provide a stronger foundation for secure authentication and authorization in networked environments. By using encryption and secure key exchange mechanisms, they help to prevent unauthorized access to network resources and protect sensitive information from being intercepted or compromised. They don't solve the fundamental limitation with Kerberos as a stateless protocol which still requires an external state application to address.

Figure 2:
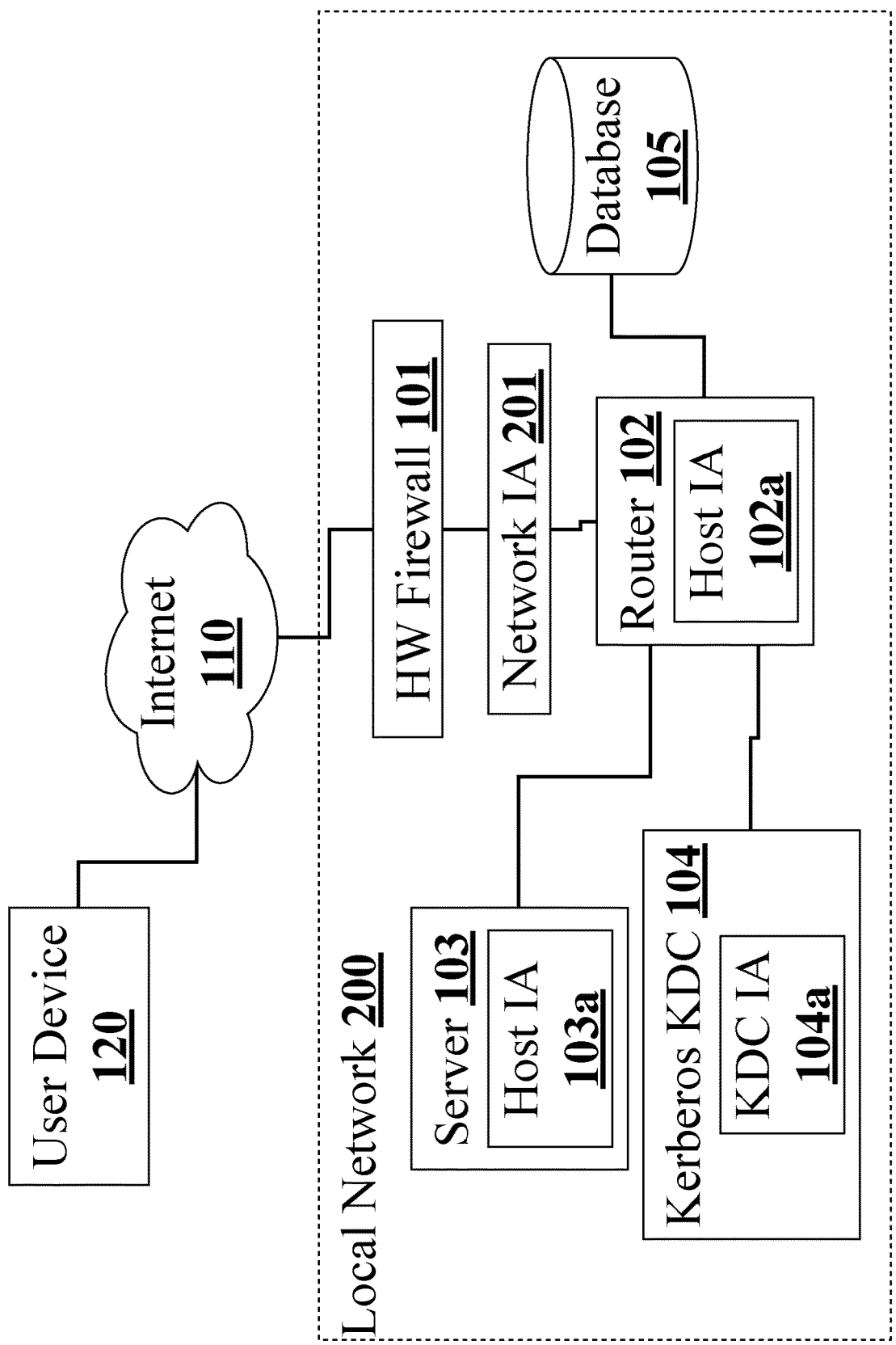
FIG. 2 is a block diagram illustrating an exemplary Kerberos-enabled network with Kerberos interdiction capabilities.

FIG. 2 is a block diagram illustrating an exemplary Kerberos-enabled network with Kerberos interdiction capabilities. According to this exemplary network 200, the functions of a network (as described above in FIG. 1) are expanded through the deployment of a plurality of interdiction agents (IAs) at various network locations, each comprising a packet capture tool such as (for example) Wireshark or similar packet capture software packages. These IAs are used to monitor and intercept network traffic in real-time, which may then be analyzed, decrypted, and incorporated into enhanced security policies through such practice as real-time revocation of false authentication credentials. A host IA 102a, 103a may be installed and operated directly on a network-connected host, such as (for example, including but not limited to) network infrastructure components such as a router 102, or a server 103 that may operate various software products or services and may run a host IA 103a as a local process (as described below, with reference to FIG. 6). A KDC IA 104a may be installed and operated directly on a Kerberos domain controller 104, enabling direct observation of KDC traffic as described below (with reference to FIGS. 4-5). A network-level IA 201 may be installed as a standalone agent operating on the network, ideally in a location where it can observe any relevant network traffic that may be intercepted for decryption and use; for example, a network IA 201 may be installed in-line with a firewall 101 or other network infrastructure component, where it may have total visibility of traffic crossing the network boundary.

As illustrated, this arrangement incorporates the use of a network packet capture tool such as Wireshark to capture network traffic on the domain controller. The captured traffic can then be analyzed using a tool such as Microsoft's Network Monitor or Message Analyzer. This may be accomplished using an interdiction agent (IA) that collects PCAP data directly from the network interface controller (NIC) and then processes the information locally. To decrypt the Kerberos traffic, all private keys stored in the domain controller's Kerberos service (KDC) must be available to the IA agent process and stored in a separate keytab-like file or local database. Once the keytab file is obtained, it can be imported into Wireshark or another packet capture tool (e.g., an IA agent workflow) to allow the decryption of Kerberos traffic (as described below, with reference to FIG. 5).

Salting and hashing are used to protect sensitive data like passwords or keys from being exposed in plain text, but they do not protect against the decryption of encrypted data. In the case of Kerberos, when messages are encrypted, they are decrypted by the recipient using the Kerberos key shared between the two parties. However, the use of salted and hashed Kerberos and SAML objects/keys can still provide protection against data misuse risk in offline analytics. This is because the salted and hashed values can be used as a substitute for the actual keys in the offline analytics process. By using the salted and hashed values instead of the actual keys, the keys themselves remain protected and cannot be used to gain unauthorized access to the network. Additionally, the use of salted and hashed values can also help protect against brute force attacks, where an attacker attempts to guess the key by trying a large number of possible combinations. The salted and hashed values make it more difficult for attackers to use precomputed tables of possible keys to crack the encryption. Similarly, decrypted Kerberos and NTLM objects can be analyzed offline to identify patterns or weaknesses in password usage. For example, an attacker may use a tool to extract Kerberos tickets or NTLM hashes from a compromised system and then analyze them offline to identify commonly used passwords or password reuse across different accounts. This can help the attacker to escalate privileges or move laterally within the network. To mitigate the risk of offline password analysis, it is important to use strong hashing algorithms and salt values when storing password hashes in a database. Salting and hashing adds an additional layer of complexity to the password hashes, making them more difficult to crack using offline attacks like rainbow tables.

Stateful validation and UEBA (User and Entity Behavior Analytics) for Kerberos can enable practical implementation of revocation by continuously monitoring and analyzing the behavior of users and entities within the system. By combining stateful validation with UEBA, organizations can identify and respond to suspicious activities, such as attempts to use revoked or compromised credentials, in real-time. By utilizing stateful validation and UEBA for Kerberos, organizations can effectively monitor and manage the revocation process, ensuring that revoked or compromised credentials are not used to gain unauthorized access to resources. Implementing revocation at the host level, network level, and KDC level through active measures and KDC notifications can further enhance security and the overall responsiveness of the system in the face of potential threats.

After intercepting and decrypting Kerberos traffic, a variety of approaches may be used to perform ad-hoc revocation of credentials that are discovered to be invalid or maliciously-acquired. The KDC can store information about compromised clients along with a timestamp indicating when the compromise was reported. Application servers can access this information and act accordingly, denying access to clients with revoked credentials. If an application server observes malicious activity (e.g., from audit log analysis), it can report this to the KDC, which then takes appropriate action. Ideally, the affected client would also be informed of the compromised credentials. The KDC can proactively send warnings to potentially affected services if a client's credentials are compromised. Warnings are sent only if a ticket for the particular service was issued and it is still valid. If an application server detects malicious activity, it can inform the KDC but continue serving the attacker, allowing time for tracking the source of the attack. When the KDC learns that a client's credentials are compromised or revoked, it can incorporate revocation information into an authorization data container for every newly issued ticket. Once the ticket receiver processes the authorization data container, it can locally revoke or filter all existing tickets for that particular user. Host based process blocks may be employed for processes initiating compromised authentication sessions, or network-based sinkholes/blocks of authentication objects or session interruptions for associated service/application interactions.

Thus, it can be appreciated that by utilizing stateful validation and UEBA for Kerberos, organizations can effectively monitor and manage the revocation process, ensuring that revoked or compromised credentials are not used to gain unauthorized access to resources. Implementing revocation at the host level, network level, and KDC level through active measures and KDC notifications can further enhance security and the overall responsiveness of the system in the face of potential threats.

Detailed Description of Exemplary Aspects

Figure 3:
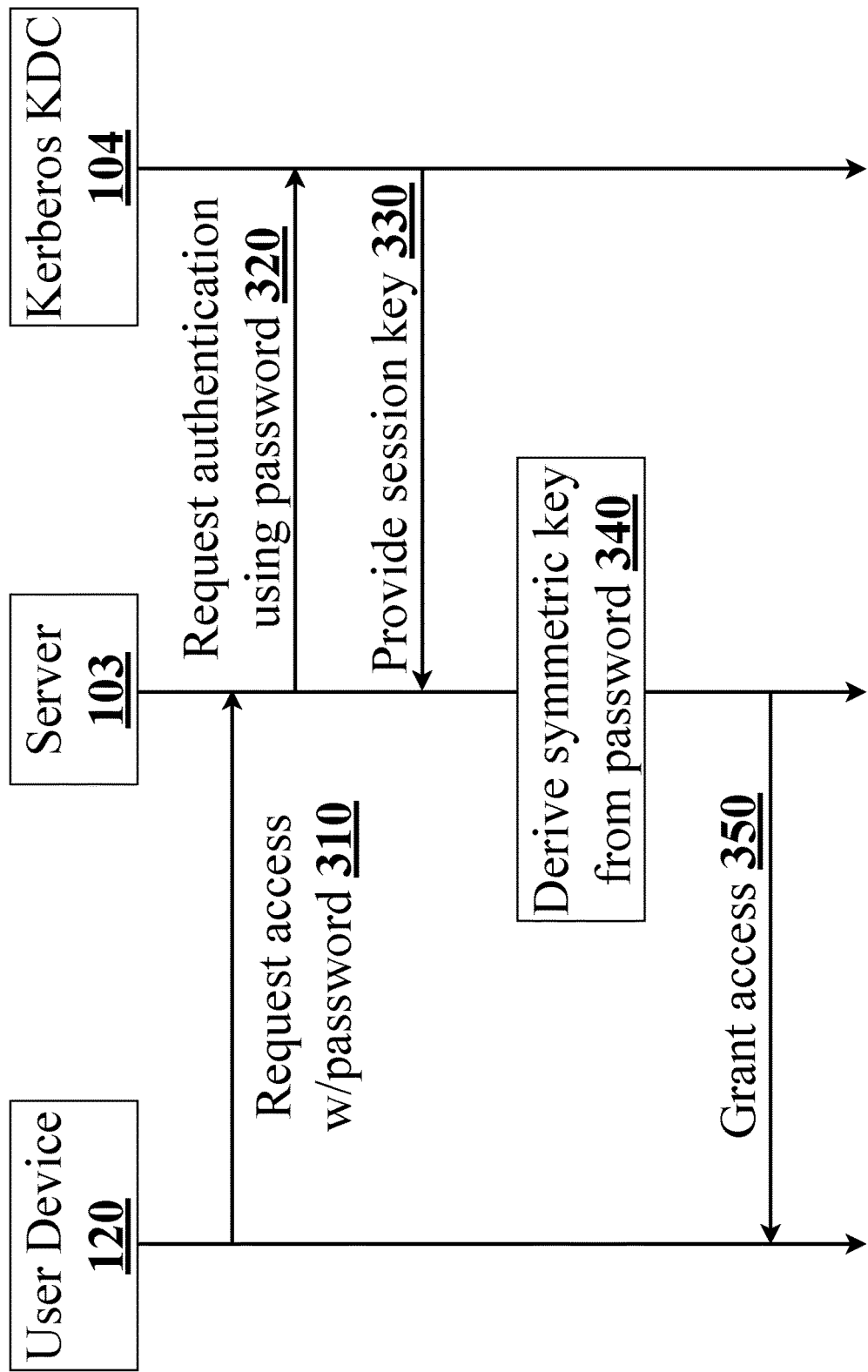
FIG. 3 is a message flow diagram illustrating an exemplary process for authenticating a user with a Kerberos KDC.

FIG. 3 is a message flow diagram illustrating an exemplary process for authenticating a user with a Kerberos KDC. As shown, a general flow for Kerberos authentication of a user proceeds as follows: Initially, a user device sends a request for access 310 including the user's password (or other appropriate credentials for the requested access) to a server 103 or other network resource. Server 103 then requests authentication for the user 320 from a KDC 104, to ensure that the user both is who they claim to be, and has been granted the access they are requesting. If the user's credentials are correct and the user's account with the KDC has been granted the requested privileges, an authenticated session key is provided 330 to the server, which then uses the user's credentials (that were provided by the user in the initial step 310) to generate a matching symmetric key 340. The user is granted access 350 and their authenticated session key, and subsequent access is provided by matching the session key against the symmetric key at the server 103.

Figure 4:
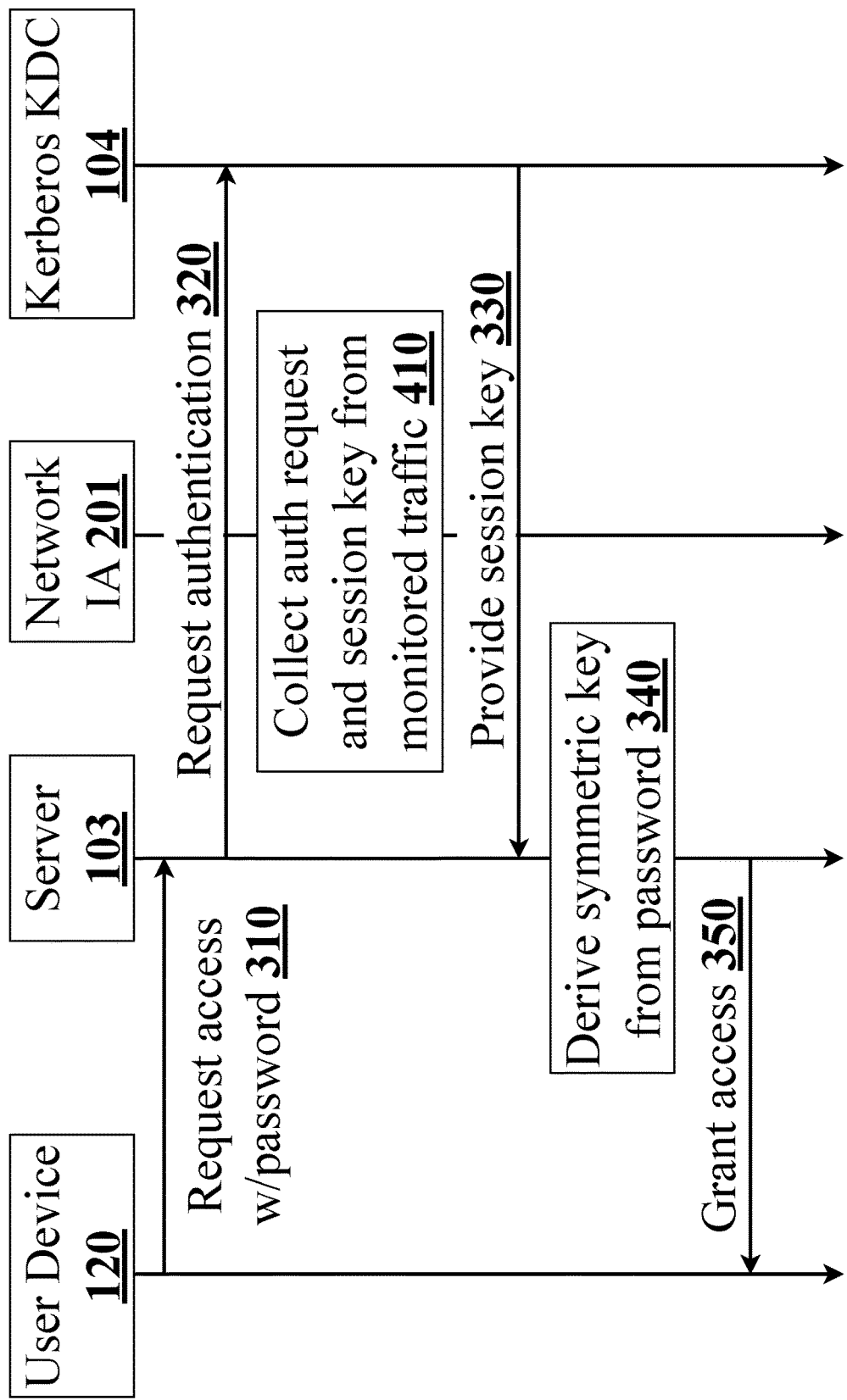
FIG. 4 is a message flow diagram illustrating the insertion of Kerberos interdiction into an authentication flow.

FIG. 4 is a message flow diagram illustrating the insertion of Kerberos interdiction into an authentication flow. As illustrated, the use of a network interdiction agent (IA) 201 with visibility into traffic between network resources and a KDC 104 enables the real-time collection of Kerberos authentication requests and responses. When a server or other resource 103 requests authentication for a user from a KDC 320, the authentication request (and thus, the user's provided credentials such as user or account name and corresponding password, two-factor token, or other credentials for authentication) may be collected and stored for further use 410. When the KDC responds to a request with an authenticated session key 330, this may also be intercepted and stored in real-time as it is provided 410. This passive collection of authentication traffic in real-time enables enhanced analysis of network traffic and the real-time revocation of invalid or maliciously-acquired credentials, such as recognizing an authenticated session key being provided for a user that has not submitted a valid request (which would indicate an attack by a malicious actor attempting to gain illicit access to network resources), or a user receiving a session key that does not match their authentication request, which might indicate an attack on the KDC directly such as to obtain greater privileges than an account should normally allow.

Figure 5:
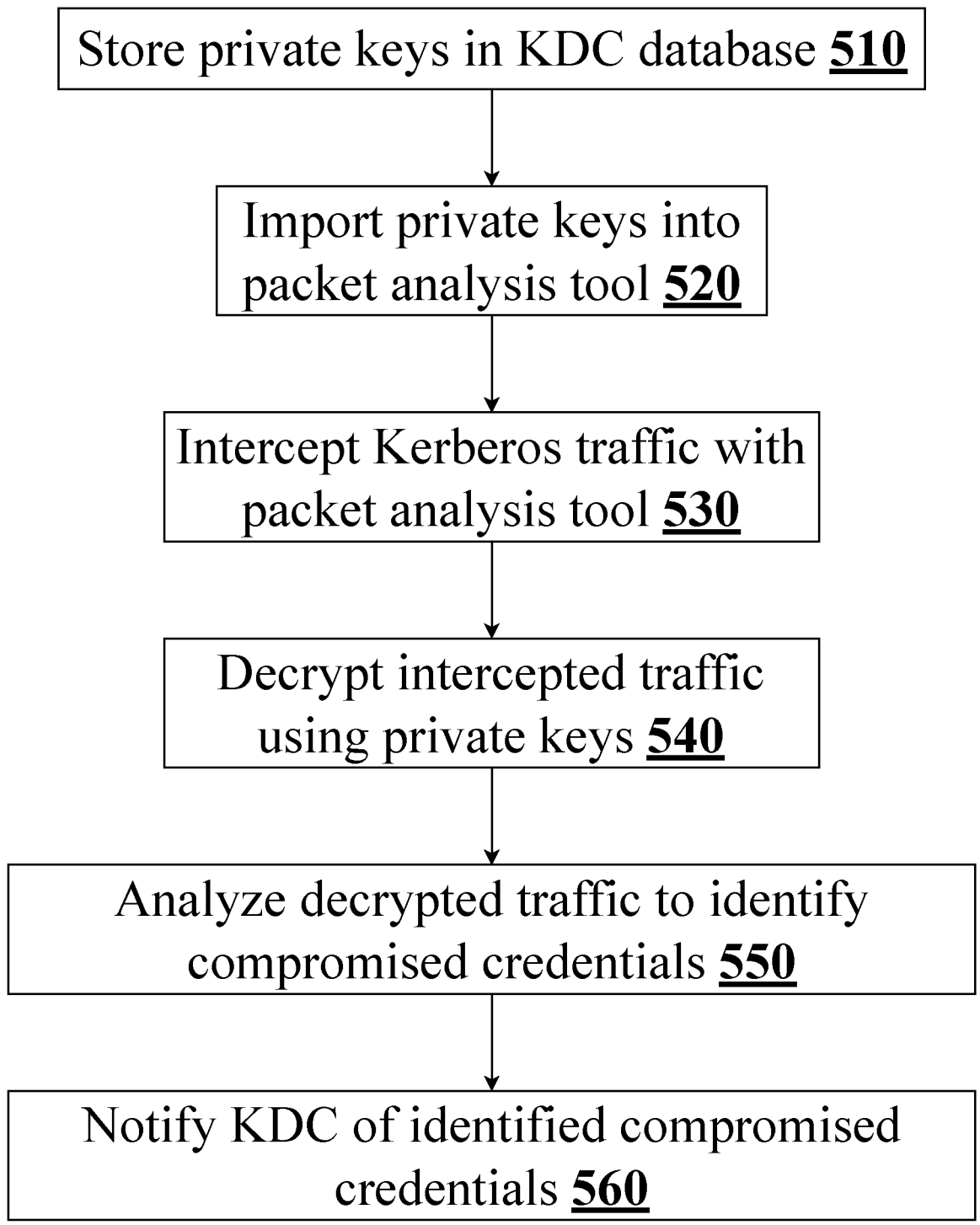
FIG. 5 is a flow diagram illustrating an exemplary method for decrypting intercepted Kerberos traffic using a host-based agent operating on a domain controller.

FIG. 5 is a flow diagram illustrating an exemplary method for decrypting intercepted Kerberos traffic using a host-based agent operating on a domain controller. To facilitate decryption of Kerberos traffic by an IA process running on the domain controller, private keys for Kerberos-enabled accounts may be stored in a KDC database 510, such as (for example) a keytab file or similar local database. These private keys may then be imported into a packet analysis tool 520, which intercepts Kerberos traffic at the domain controller in real-time 530. Intercepted traffic may then be decrypted using the imported private keys 540, enabling analysis of the decrypted data 550 to identify compromised credentials such as (for example, including but not limited to) forged or maliciously-acquired credentials. When compromised credentials are detected, the KDC may be notified 560 so that action may be taken in real-time, such as notifying affected users or revoking the compromised credentials to prevent their use by an attacker.

Compared to operating a network IA intercepting traffic as it passes through the IA node to its destination, host-based agents are better able to handle authentication object decryption for Kerberos, SAML, RADIUS, and NTLM, as they are installed directly on the systems involved in the authentication process, such as the Key Distribution Center (KDC), Active Directory (AD), identity provider (IdP), or service provider (SP) servers. This direct access to the host systems provides several advantages.

Host-based agents can directly access the key material needed for decryption, such as the key material on a KDC for Kerberos, or certificates and private keys for SAML, RADIUS, and NTLM. This allows the agent to decrypt the authentication objects and analyze the content for security monitoring and threat detection. Since host-based agents operate at the host level, they can access the decrypted authentication data as it is processed by the authentication services. This enables the agent to monitor the authentication transactions without the need to decrypt the data independently. Host-based agents can monitor authentication events in real-time, allowing them to detect and respond to potential threats more quickly than network-based solutions that rely on packet capture and analysis. Decrypting authentication objects at the host level consumes fewer resources compared to network-based decryption, as it eliminates the need for additional processing and re-encryption.

To enable decryption on network devices, host-based agents can be used to obtain the necessary key material and pass it to the network devices. This can be achieved through secure communication channels and proper key management practices. Host-based agents can establish secure communication channels with network devices using encryption and authentication protocols. The agent can then securely transmit the key material to the network device, or the network devices can do a DC Sync via DRS protocol directly and be added to a DC whitelist as authorized devices to conduct such activity. Key material, such as encryption keys and certificates, should be updated periodically to maintain security. Host-based agents can automate this process by detecting changes in the key material and updating the network devices accordingly. Alternatively, the network device can subscribe to replication in a manner similar to Read Only Domain Controllers. Host-based agents can monitor the usage of key material on the host systems and network devices, ensuring that the keys are used only for authorized purposes and detecting any unauthorized access attempts. By utilizing host-based agents for authentication object decryption and key management, organizations can enhance their security posture and enable more efficient monitoring of authentication transactions on both the host and network levels.

Figure 6:
FIG. 6 is a flow diagram illustrating an exemplary method for creating a repository of credential events for servers to access as needed.

FIG. 6 is a flow diagram illustrating an exemplary method for creating a repository of credential events for servers to access as needed. When using a host-based IA operating on a KDC (as described above, with reference to FIG. 5) to monitor Kerberos traffic 610, the KDC may be notified by the IA of any observed compromised credentials 620 as described above. In addition to notifying the KDC so that action may be taken, a timestamped record of the discovery of the compromised credentials may be stored in a database 105, so that a record is made in real-time for every discovery event. When a credential revocation event is received from the KDC 630, a timestamped record of the revocation may also be stored in the database 640 so that there is a record of precisely when the credentials were revoked in response to the observed traffic. In addition, notifications may be received from other IAs operating (for example) as host-based processes on other network resources, or as network-based IAs observing traffic at the network level 650, and timestamped records of these notifications may be stored 660 so that all observed credential events are timestamped and collected in a database that may be used to respond to credential attacks, as described below (with reference to FIGS. 7-9). This database may be used to proactively handle accounts with compromised credentials, rather than waiting for a response from the KDC, enabling real-time revocation of credentials, modification of account privileges, generation of warnings to alert a user of a compromise of their account, or silently observing a compromised account to learn more about an attacker without alerting them that they have been discovered.

Figure 7:
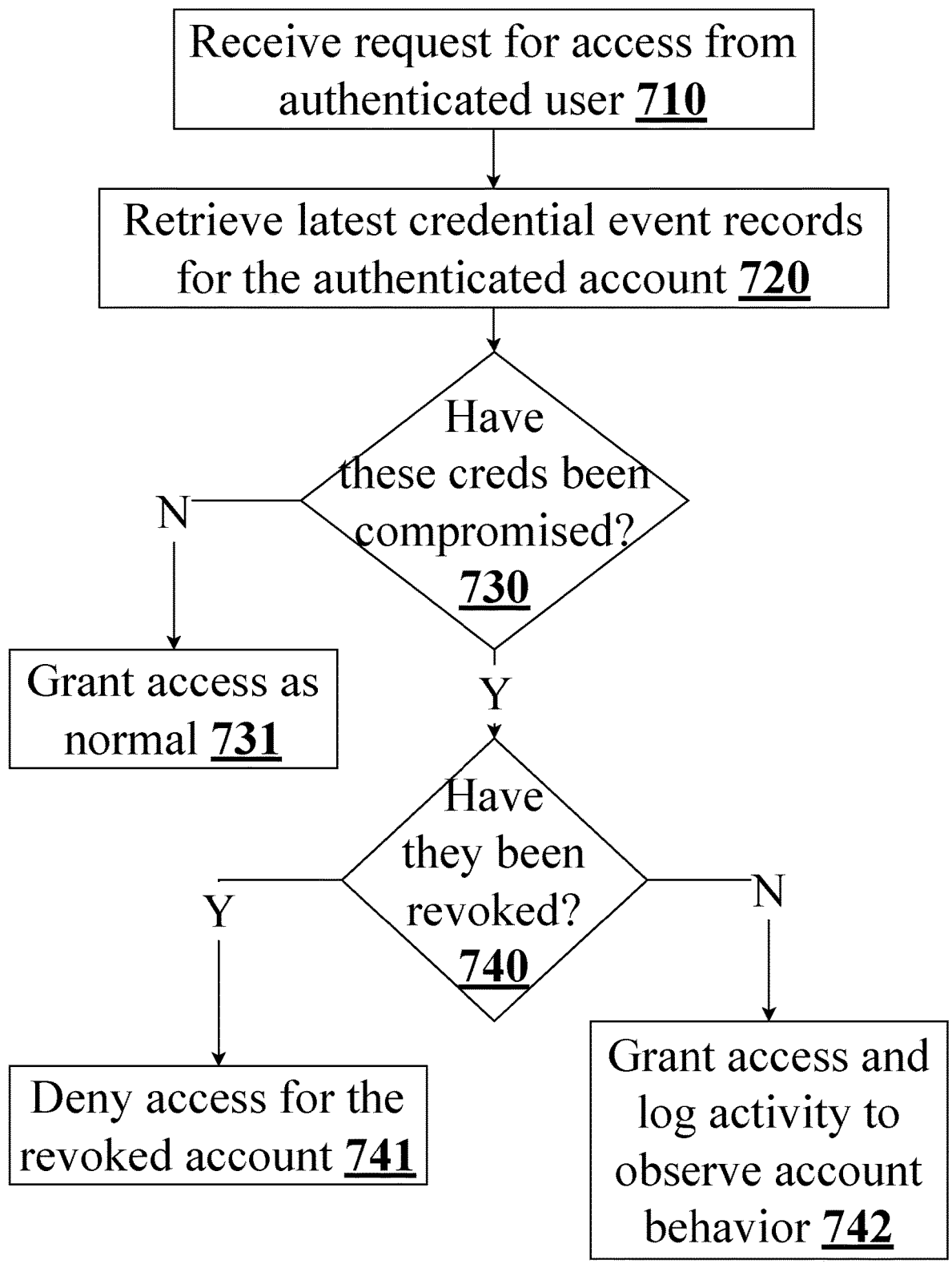
FIG. 7 is a flow diagram illustrating an exemplary method for using stored credential events to manage user access at a network resource.

FIG. 7 is a flow diagram illustrating an exemplary method for using stored credential events to manage user access at a network resource. When a network resource such as a server receives a request for access from an authenticated user account 710, it may fetch recent credential event records for the requesting account from a repository 720 such as that created according to the method of FIG. 6, to check whether the credentials provided for the account have been compromised 730. If not, access may be granted as usual 731 and operation proceeds normally. If there is a record of the credentials being compromised, the records may then be checked for a credential revocation event 740. If the credentials have already been revoked, the user may be denied access 741 to block outdated credentials. If the credentials have not been revoked, access may be granted while observing and logging all activity 742 to observe the behavior of the account. This may reveal an attacker's motives or targets, or it may reveal that the activity is from a legitimate user that may be unaware of their account having been compromised. In this manner, compromised credentials may be handled in real-time with adaptive response behavior based on the timing of the compromise, revocation, and attempted access taking place.

Figure 8:
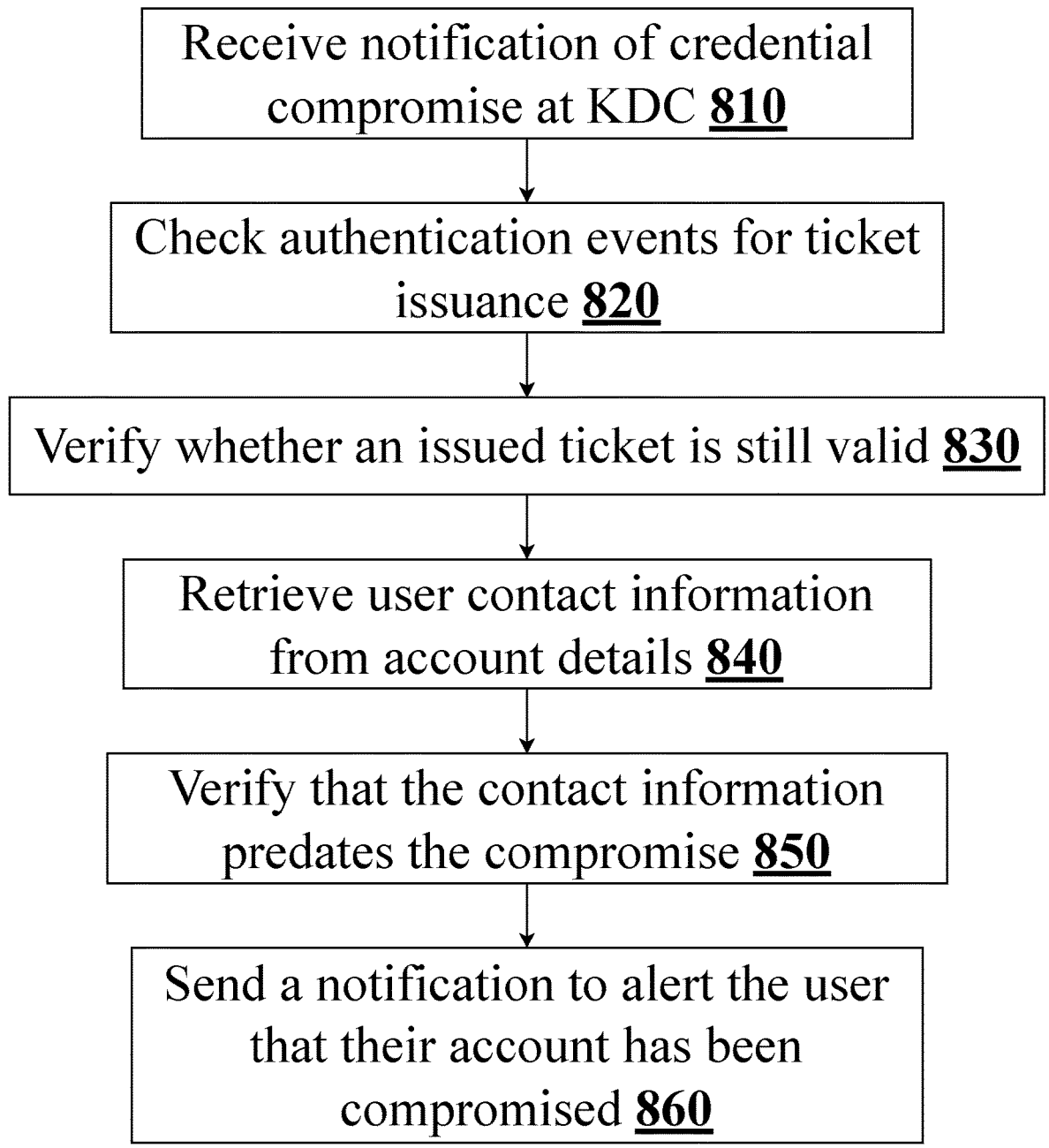
FIG. 8 is a flow diagram illustrating an exemplary method for alerting a user when their credentials have been compromised.

FIG. 8 is a flow diagram illustrating an exemplary method for alerting a user when their credentials have been compromised. When a KDC receives notice of an account's credentials being compromised 810, such as from a host-based IA monitoring authentication traffic at the KDC (as described above in FIG. 6), authentication logs may be checked to determine if a ticket has been issued for this account recently 820. If a ticket was issued, the logs may then be checked to determine whether the ticket is still valid 830 and may be used to access services and resources based on the account's privileges. Contact information for a user associated with the account may be retrieved from the account information stored in the KDC 840, and the retrieved contact information may be compared against the authentication logs to verify that it predates the time the account was compromised 850 (to ensure that the contact information has not been tampered with and is still valid for the user). A notification may then be sent to the user based on verified contact information, alerting them of the account compromise 860 so that the user may take action on their account such as changing their password(s) or logging out of any connected resources or services using those credentials.

Figure 9:
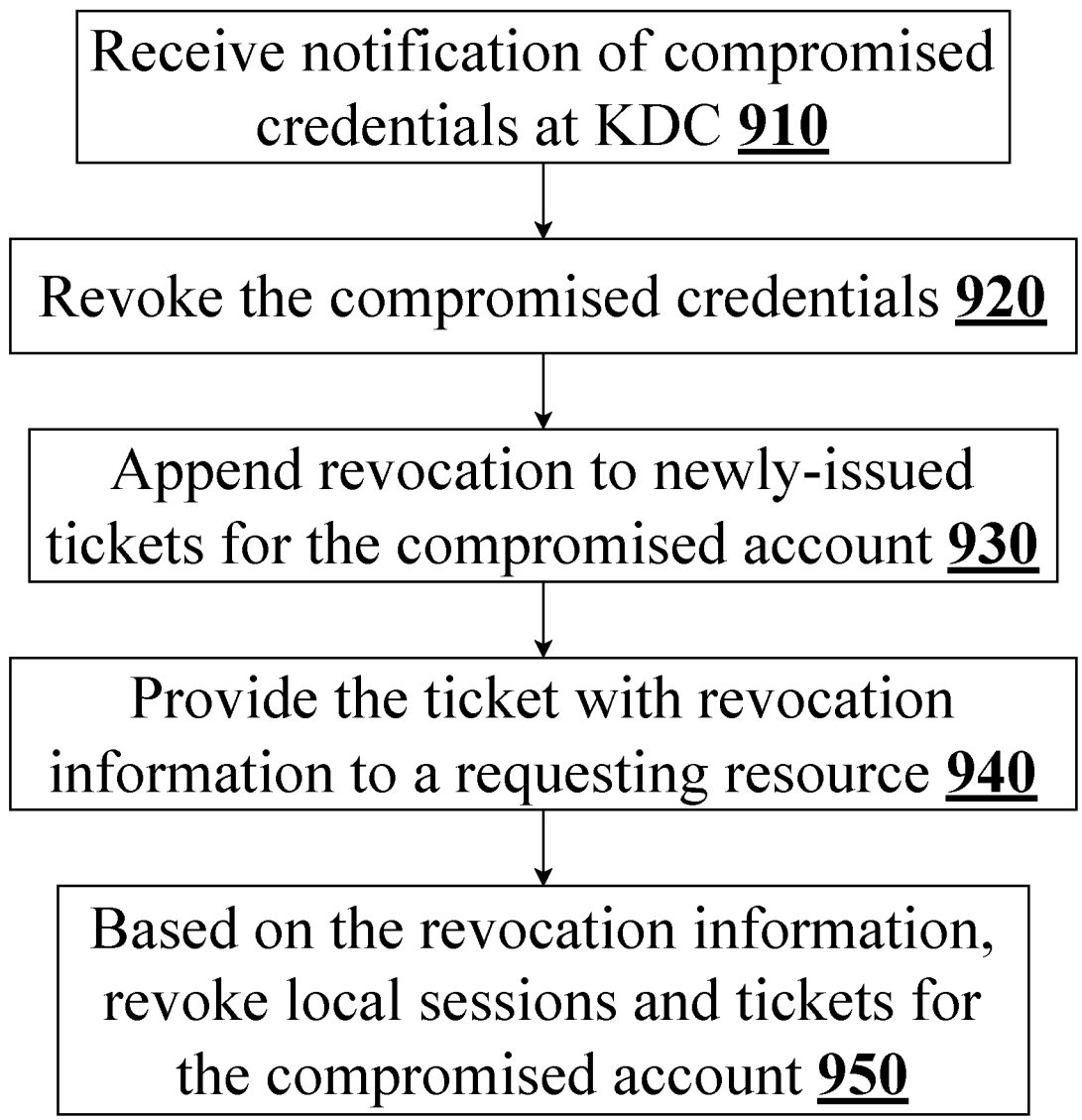
FIG. 9 is a flow diagram illustrating an exemplary method for incorporating credential revocation information into subsequently-issued authentication tickets for use in local revocation.

FIG. 9 is a flow diagram illustrating an exemplary method for incorporating credential revocation information into subsequently-issued authentication tickets for use in local revocation. When a KDC receives notice of an account's credentials being compromised 910, such as from a host-based IA monitoring authentication traffic at the KDC (as described above in FIG. 6), the compromised credentials may be revoked 920 to prevent their use by an attacker. This revocation event may be appended to a new authorization ticket for the compromised account 930, that may be provided to a networked resource that requests authentication for the compromised account 940. Thus, if an account is compromised and an attacker attempts to gain access to a resource, rather than simply denying the request a revocation ticket may be provided by the KDC. Then, based on the revocation information received at the resource 950, any local sessions and authentication tickets for the compromised account may be revoked to restrict the attacker's access. For example, a compromised account may have been used to access a service prior to the revocation of its credentials; this revocation ticket approach enables the revocation of previously-authenticated sessions once the resource received notification (via the revocation ticket) of the compromised credentials.

Hardware Architecture

Figure 10:
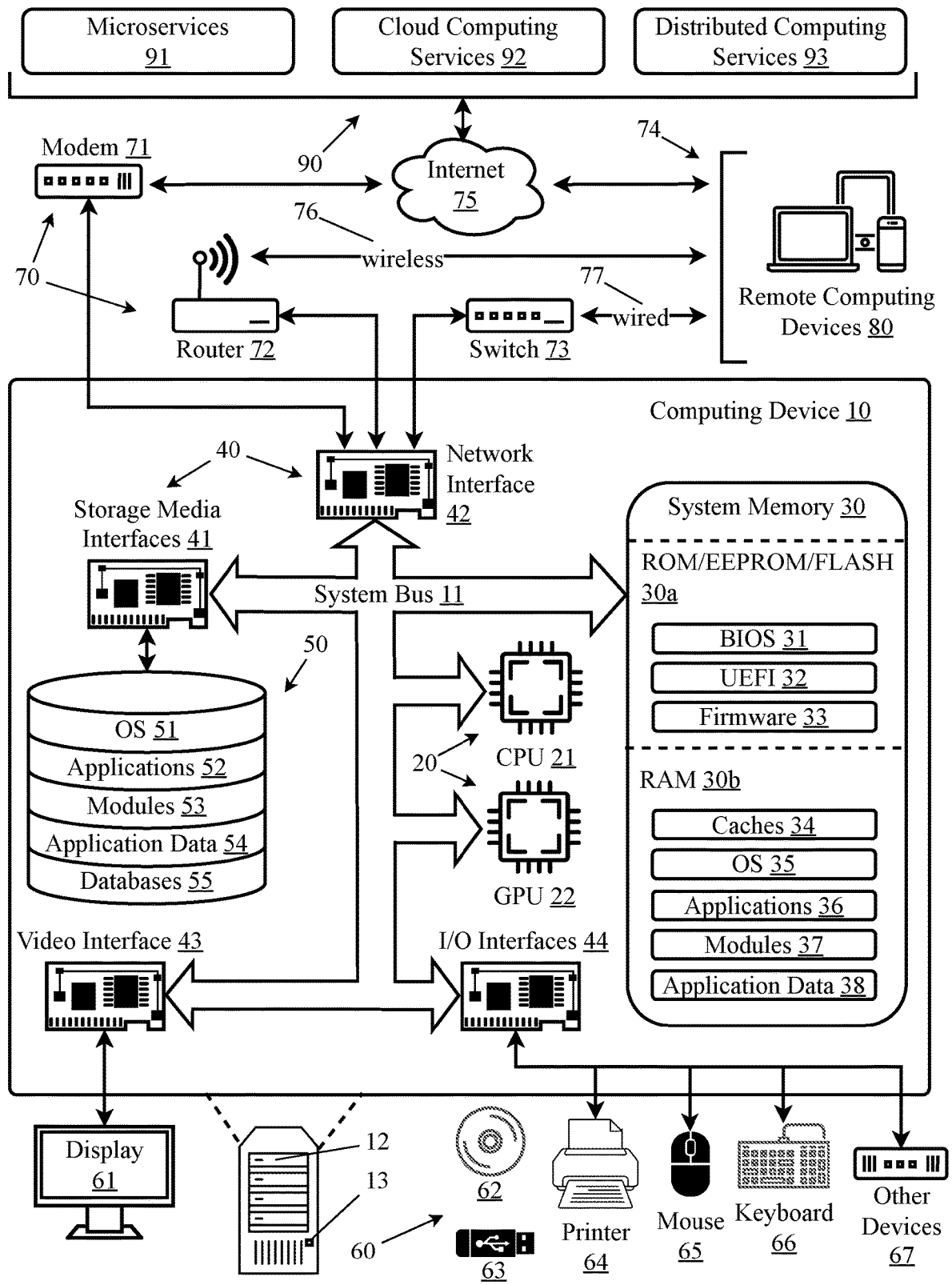
FIG. 10 illustrates an exemplary computing environment on which an embodiment described herein may be implemented, in full or in part.

FIG. 10 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). However, the term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable or independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory 30a such as read only memory (ROM), electronically-erasable programmable memory (EEPROM), or rewritable solid state memory (commonly known as "flash memory"). Non-volatile memory 30a is not erased when power to the memory is removed. Non-volatile memory 30a is typically used for long-term storage a basic input/output system (BIOS) 31, containing the basic instructions, typically loaded during computer startup, for transfer of information between components within computing device, unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b such as random access memory (RAM) is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage provide long-term storage of data. Data on non-volatile data storage devices 50 is not erased when power to the non-volatile data storage devices 50 is removed. Non-volatile data storage devices 50 may be implemented using technology for non-volatile storage of content such as CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing 10 as in the case of internal hard drives, removable from computing device 10 as in the case of external USB hard drives, or a combination thereof, but computing device will comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 30 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services.

Microservices 91 are collections of small, loosely coupled, and independently deployable computing services. Each microservice represents a specific business functionality and runs as a separate process or container. Microservices promote the decomposition of complex applications into smaller, manageable services that can be developed, deployed, and scaled independently. These services communicate with each other through well-defined APIs (Application Programming Interfaces), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. For example, cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for Kerberos interdiction and decryption for real-time analysis, comprising:
    an interdiction agent comprising a network packet capture and cryptographic processing software including at least a first plurality of programming instructions stored in a memory of, and operating on at least one processor of, a computing device, wherein the first plurality of programming instructions, when operating on the at least one processor, causes the computing device to:
        receive a network request comprising encrypted Kerberos authentication tickets;
        import an authentication private key from a Kerberos Key Distribution Center (KDC) data store associated with the network request;
        decrypt the encrypted Kerberos authentication tickets using the imported authentication private key;
        analyze the decrypted authentication ticket in real-time to determine credential validity and detect security events;
        generate a timestamped notification for the detected security events comprising details of detected credential events and responsive actions; and
        initiate revocation of the authentication tickets when invalid the analyzing determines invalid credentials.

2. The system of claim 1, further comprising a domain controller comprising at least a second plurality of programming instructions stored in a memory of, and operating on at least one processor of, a computing device, wherein the second plurality of programming instructions, when operating on the at least one processor, causes the computing device to:
    generate a new private key corresponding to a user account;
    store the new private key in a data store;
    receive the notification from the interdiction agent; and
    revoke the new private key based on the notification.

3. The system of claim 2, wherein the interdiction agent and the domain controller are both stored in the memory of, and operating on at least one processor of, the same computing device.

4. The system of claim 2, wherein the interdiction agent and the domain controller are each stored in the memory of, and operating on at least one processor of, separate computing devices.

5. A method for Kerberos interdiction and decryption for real-time analysis, comprising the steps of:
    receiving a network request comprising encrypted Kerberos authentication tickets;
    importing an authentication private key from a Kerberos Key Distribution Center (KDC) data store associated with the network request;
    decrypting the encrypted Kerberos authentication tickets using the imported authentication private key;
    analyzing the decrypted authentication ticket in real-time to determine credential validity and detect security events;
    generating a timestamped notification for the detected security events comprising details of detected credential events and responsive actions; and
    initiating revocation of the authentication tickets when invalid the analyzing determines invalid credentials.

6. The method of claim 5, further comprising the steps of:
    generating, using a domain controller, a new private key corresponding to a user account;
    storing the new private key in a data store;
    receiving the notification from the interdiction agent; and
    revoking the new private key based on the notification.

7. The method of claim 6, wherein the interdiction agent and the domain controller are both stored in the memory of, and operating on at least one processor of, the same computing device.

8. The method of claim 6, wherein the interdiction agent and the domain controller are each stored in the memory of, and operating on at least one processor of, separate computing devices.

* * * * *